United States Patent [19]

Cooper et al.

[11] Patent Number: 5,805,882
[45] Date of Patent: Sep. 8, 1998

[54] COMPUTER SYSTEM AND METHOD FOR REPLACING OBSOLETE OR CORRUPT BOOT CODE CONTAINED WITHIN REPROGRAMMABLE MEMORY WITH NEW BOOT CODE SUPPLIED FROM AN EXTERNAL SOURCE THROUGH A DATA PORT

[75] Inventors: Patrick R. Cooper, Houston; David J. DeLisle, Spring; Hung Q. Le, Katy, all of Tex.

[73] Assignee: Compaq Computer Corporation, Houston, Tex.

[21] Appl. No.: 684,413

[22] Filed: Jul. 19, 1996

[51] Int. Cl.[6] .................................................. G06F 9/445
[52] U.S. Cl. .......................................... 395/652; 711/166
[58] Field of Search .................................. 395/652, 552; 207/205; 711/166

[56] References Cited

U.S. PATENT DOCUMENTS

| 5,150,407 | 9/1992 | Chan .................................... 380/4 |
| 5,325,532 | 6/1994 | Crosswy et al. ................... 395/652 |
| 5,327,531 | 7/1994 | Bealkowski et al. .............. 395/164 |
| 5,388,267 | 2/1995 | Chan et al. ........................ 395/652 |
| 5,544,356 | 8/1996 | Robinson et al. ................. 707/205 |
| 5,557,783 | 9/1996 | Oktay et al. ...................... 395/552 |
| 5,603,055 | 2/1997 | Evoy et al. ........................ 395/652 |

OTHER PUBLICATIONS

Intel Corp., Intel 486 SL Microprocessor SuperSet Programmer's Reference Manual, Nov., 1992, pp. 6–28—6–53.

Philips Semiconductors, I²C Spec. information —The I²C Bus and how to use it (including specifications), 1993.

Intel Corp., System Management Bus Specification, Apr. 21, 1994 (Rev. 0.95).

Cates, Ron, et al., "Charge NiCd and MiMH Batteries Properly," Electronic Design, Jun. 10, 1996, pp. 118, 120, 122.

EET Special Edition. Part 2: Batteries —Power Technologies, Elec. Eng. Times, Apr. 8, 1996, pp. 39–82.

Microchip Data Sheet Manual, PIC 16C5X EPROM/ROM–Based 8–Bit CMOS Microcontroller Series (1995–1996).

Siemens Components, Inc., Advertisement for SAB88C166 with on–board flash EPROM (Sep. 1996).

*Primary Examiner*—Tod R. Swann
*Assistant Examiner*—David Laugjahr
*Attorney, Agent, or Firm*—Pravel, Hewitt, Kimball & Krieger

[57] ABSTRACT

In accordance with the invention, a computer system is provided with a flash read-only-memory (ROM), a microcontroller and a data port. The microcontroller initially owns the flash ROM. The microcontroller further has a separate ROM upon which it can execute boot-up instructions. After booting up, the microcontroller checks the flash ROM contents, preferably by performing a check-sum of the flash ROM contents. If the checksum of the flash ROM contents matches an expected value, the microcontroller releases ownership of the flash ROM to the computer system so that the computer system boots-up as normal. If the microcontroller determines that the flash ROM has become corrupted, the microcontroller accesses the data port and looks for a flash programming protocol. If the protocol is present at the data port, the microcontroller receives the data from the data port and programs the flash ROM accordingly. In this manner, the flash ROM can be updated to a good known state, even if the computer system is not able to boot up due to, among other things, the corruption of the flash ROM.

38 Claims, 11 Drawing Sheets

HOST SENDING TO TARGET

TARGET RESPONDING TO HOST

COMPUTER SYSTEM AND METHOD FOR REPLACING OBSOLETE OR CORRUPT BOOT CODE CONTAINED WITHIN REPROGRAMMABLE MEMORY WITH NEW BOOT CODE SUPPLIED FROM AN EXTERNAL SOURCE THROUGH A DATA PORT

BACKGROUND OF THE INVENTION

1. Field of the Invention

The present invention relates to an apparatus for programming the memory of a computer, and more specifically, to an apparatus for updating the contents of a flash read-only-memory (ROM) in the computer.

2. Description of the Related Art

Today's modern personal computer typically includes a microprocessor, a memory system, data storage devices, and input/output (I/O) devices such as a display, a keyboard, a mouse, and communication devices, among others. The computer system is typically initialized, or boot-strapped, during a power up sequence using system software and information representing the sequence of internal control variables stored within a system read-only-memory (ROM). Since the system ROM is non-volatile, the content of the ROM contains valid data or instructions so that the computer system can be reliably boot-strapped to a point where the disk operating system (DOS) can be loaded to complete the boot-up sequence.

One computer system utilizing the ROM-based boot code approach is the IBM personal computer (PC) developed by the IBM Corporation of Armonk, New York. In an IBM PC or an IBM compatible PC system, the system ROM stores the Basic Input/Output System (BIOS) which is executed upon power-up by the microprocessor to initialize the system, to perform a power on self-test (POST) and to provide certain low level, hardware dependent support for the display, floppy/hard disk drives, and communication devices. More sophisticated routines and data may be included in the system ROM depending upon the needs and complexity of a given computer system.

In the original PC architecture, the BIOS code was relatively simple and required little memory space (about 32 KB total). BIOS code provides the lowest level of interface between the operating system and the hardware. It normally is located at the top of memory for the original 8088 system of the original PC. In the original IBM PC architecture, the BIOS code is stored beginning at F8000h.

The introduction of the BIOS created a problem that has been integrated into the PC: every new system hardware component that was not already supported in the BIOS required a new BIOS to be generated, or at least an upgrade of the existing BIOS. This meant that OEMs and system manufacturers needed to keep abundant quantities of ROMs handy to accommodate new BIOS versions. Further, since the original IBM PC design, the BIOS code has undergone continual development, including the addition of custom features to enhance system flexibility and the addition of more complex setup routines. Today's BIOS includes support for previously advanced features such as system configuration analysis (diagnostics), power management, networking capability and I/O support for devices with extremely high transfer rates. This expansion continued until the original AT BIOS eventually consumed the entire reserved BIOS space. Further, errors in the BIOS code requiring corrections and new versions or new releases of the secondary boot code are common, so that the primary and secondary boot codes stored in the system ROM are generally subject to modifications. The ability to upgrade in the field is thus desirable as it positively affects the economics of operating and maintaining the computer system.

Several types of ROMs are commercially available. A basic ROM, referred to as a masked ROM, has its code hardwired internally at the factory and thus cannot be reprogrammed later. Masked ROMs have been used as system ROMs due to their low costs. However, masked ROMs must be completely replaced if changes in the boot code are desired or become necessary. Since enhancements and upgrades are common to the system ROM, particularly to support new peripheral devices, masked ROMs are not preferred for use as system ROMs because of lead time and difficulty in upgrading the ROMs in the field.

Another type of ROM similar to the masked ROM is referred to as a one-time programmable (OTP) ROM. The OTP ROM is programmed once by the manufacturer of the computer system, but cannot be reprogrammed. OTP ROMs are sometimes preferred over masked ROMs for system ROM purposes since the computer manufacturer has control over the boot code programming to the OTP ROMs and can provide upgraded ROMs more readily. Nonetheless, OTP ROMs are undesirable to alone contain the system ROM since they are not field reprogrammable.

Several programmable ROMs are commercially available, generally referred to as erasable programmable ROMs (EPROMs). These devices include ultra-violet (UV) EPROMs and electrically erasable programmable ROMs (EEPROMs). UV EPROMs require external access to the ROMs to be erased, possibly even removal from the computer system. Thus, they are neither convenient nor economical for reprogramming purposes. EEPROMs are not necessarily desirable for system ROM purposes since they are very expensive and have little storage capacity.

A flash ROM, a relatively new storage device, provides an alternative to EEPROMs for the non-volatile storage of the POST and BIOS routines required for the initialization of the computer system. The flash ROM can be quickly reprogrammed without being removed from the system, so the flash ROM provides a more expeditious and less costly solution over EPROMs when field updates are required. The flash memory, by virtue of its electrical programmability and erasability, is easily updated under system software control while being physically connected to the computer motherboard. This allows, for example, a manufacturer to download test code as the system moves down the manufacturing line, and to reprogram the BIOS boot-up code into the system ROM as required prior to shipping the computer from the factory. Further, by simply running an "update" routine and accessing code from a manufacturer supplied diskette or electronic bulletin board, a customer can easily update his or her system BIOS to remove initial production bugs or enhance capabilities. The result is a computer system with longer lifetime. The elimination of the system obsolescence due to old BIOS version adds to the customer satisfaction.

Normally, it is possible to reprogram the flash ROM with a program. However, if the computer system fails to boot-up due to one or more anomalies, the corrupted flash ROM cannot be reprogrammed. The computer system must then be sent to a service center where it is opened to access the flash ROM pins for programming purposes. Even though the service center can replace the flash ROM, the process of opening the computer case and replacing the flash ROM adds unnecessary labor costs. Hence, the ability to update the flash ROM via one of the data ports, even if the flash ROM has become corrupted such that the computer system cannot boot, is more efficient, desirable, and economically advantageous.

SUMMARY OF THE INVENTION

In accordance with the invention, a computer system is provided with a flash ROM, a microcontroller and a data port. The microcontroller further has a separate ROM from which it can execute boot-up instructions. After the microcontroller boots-up, the flash ROM is initially owned by the microcontroller. The microcontroller validates the flash ROM contents, preferably by performing a check-sum of the flash ROM contents. If the checksum of the flash ROM contents matches an expected value, the microcontroller releases ownership of the flash ROM to the computer system and releases the computer system reset line so that the computer system can then boot from the flash ROM.

If the microcontroller instead determines that the flash ROM is corrupted, the microcontroller accesses the data port and looks for a flash ROM programming protocol sequence. If the protocol is present at the data port, the microcontroller receives data from the data port and programs the flash ROM accordingly. In this manner, the flash ROM can be updated to a known valid state, even if the computer system is unable to boot up because of, among others, the corruption of the flash ROM.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/684,686 entitled "IMPROVED CONTROL OF COMPUTER AC ADAPTER OUTPUT VOLTAGE VIA BATTERY PACK FEEDBACK," by Brian C. Fritz, William C. Hallowell, Thomas P. Sawyers, Norman D. Stobert, Robert F. Watts and Michael E. Schneider, filed concurrently herewith;

U.S. application Ser. No. 08/684,420 entitled "MULTI-FUNCTION POWER AND KEYBOARD CONTROLLER," by David J. Delisle, William C. Hallowell and Patrick R. Cooper, filed concurrently herewith;

U.S. application Ser. No. 08/684,413 entitled "FLASH ROM SHARING," by Hung Q. Le and David J. Delisle, filed concurrently herewith;

U. S. application Ser. No. 08/684,486 entitled "BUS SYSTEM FOR SHADOWING REGISTERS," by Dwight D. Riley and David J. Maguire, filed concurrently herewith;

U.S. application Ser. No. 08/684,412 entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards, filed concurrently herewith;

U.S. application Ser. No. 08/684,485 entitled "LONG LATENCY INTERRUPT HANDLING AND INPUT/OUTPUT WHILE POSTING," by David J. Maguire and James R. Edwards, filed concurrently herewith;

U.S. application Ser. No. 08/684,710 entitled "SERIAL BUS SYSTEM FOR SHADOWING REGISTERS," by David J. Maguire and Hung Q. Le, filed concurrently herewith;

U.S. application Ser. No. 08/684,584 entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. application Ser. No. 08/671,316 entitled "TWO ISA BUS CONCEPT," by Gregory N. Santos, James R. Edwards, Dwight D. Riley and David J. Maguire, filed concurrently herewith;

U.S. application Ser. No. 08/684,490 entitled "RECONFIGURABLE DUAL MASTER IDE INTERFACE," by Gregory N. Santos, David J. Maguire, William C. Hallowell and James R. Edwards, filed concurrently herewith; and U.S. application Ser. No. 08/684,255 entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

Figure 1:
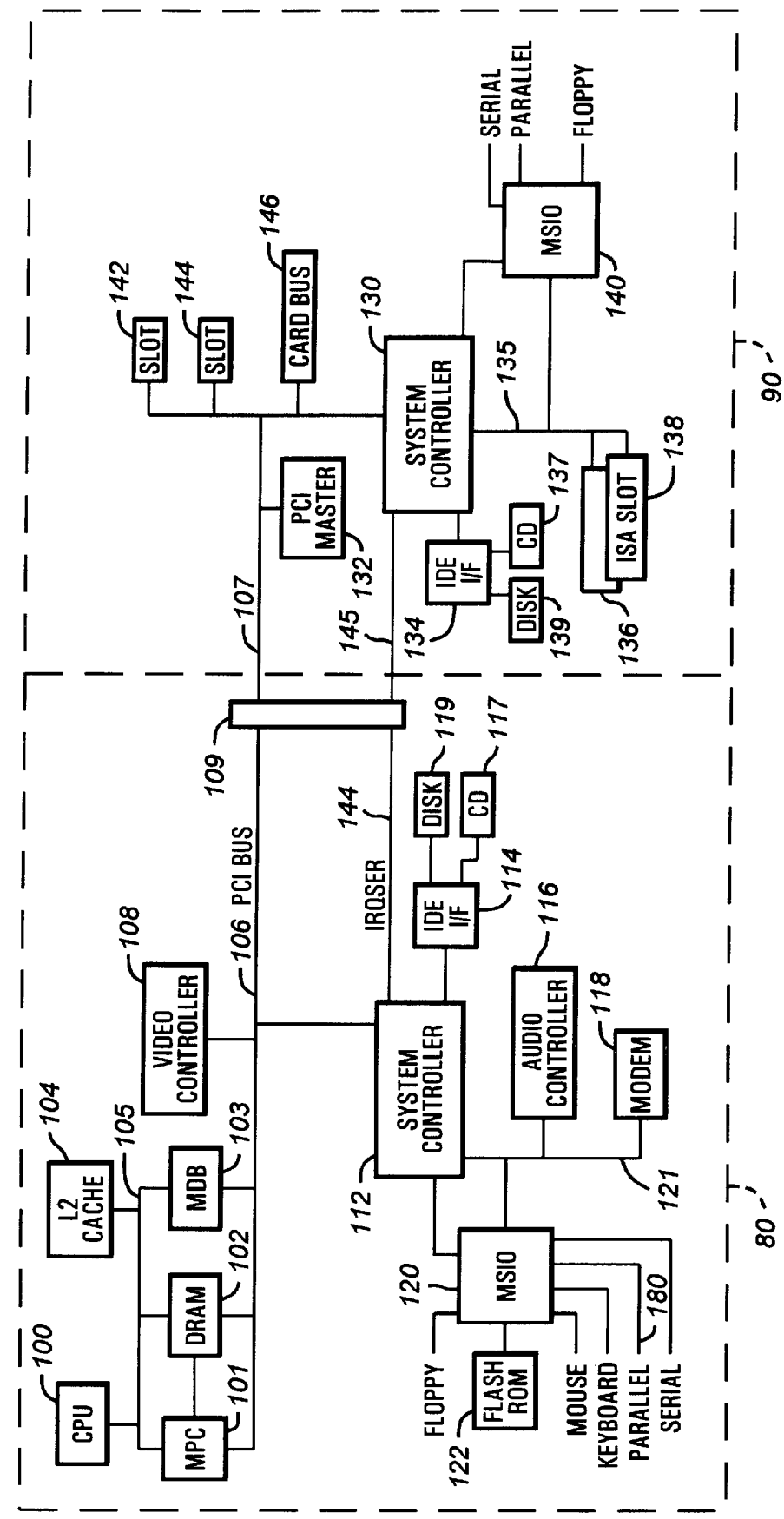
FIG. 1 is a block diagram of a computer system having a flash ROM updating device in accordance with the present invention.

Turning now to the drawings, FIG. 1 is a computer system S according to the present invention. In FIG. 1, the system S comprises a portable computer 80 and an expansion base unit 90. Within the portable computer 80, a CPU 100 and a level two (L2) cache 104 are connected to a high speed local bus 105. The processor 100 of the preferred embodiment is one of the 80×86 microprocessor family manufactured by Intel Corporation of Santa Clara, Calif. In the preferred embodiment, the processor operates with a standard IBM-PC compatible operating system, such as MS-DOS or Windows, available from Microsoft Corporation of Redmond, Washington. The L2 cache 104 provides additional caching capabilities to the processor's on-chip cache to improve performance.

In addition to the CPU 100 and cache 104, a number of memory interface and memory devices are connected between the local bus 105 and a PCI bus 106. These devices include a memory to PCI cache controller (MPC) 101, a dynamic random access memory (DRAM) array 102, and a memory data buffer (MDB) 103. The MPC 101 is connected to the DRAM array 102, which is further connected to the MDB 103. The MPC 101, DRAM array 102, and MDB 103 collectively form a high performance memory system for the computer system S. A video controller 108 is also connected to a PCI bus 106.

The PCI bus 106 is also connected to a system controller 112. The system controller 112 is a PCI to ISA bus bridge which also provides various support functions for the portable computer 80 and the expansion base unit 90 of the system S. Preferably the system controller 112 is a single integrated circuit that acts as a PCI bus master and slave, an ISA bus controller, an ISA write posting buffer, an ISA bus arbiter, DMA devices, and an IDE disk interface. The system controller 112 is connected to an audio controller 116 and a modem 118 as conventionally present in PC systems to provide sound and data communication capabilities for the system S via a first ISA interface 121. The system controller 112 is also connected to an IDE interface port 114 for driving one or more peripheral devices such as hard disk drives, preferably a CD-ROM player 117 and a disk drive 119. The peripheral devices such as the disk drives typically store boot data used during the initial power up of the computer system. Further, the system controller 112 provides a single pin output to support an interrupt serial bus (IRQSER) 144.

The system controller 112 is connected to an MSIO (mobile super I/O) chip 120. The MSIO 120 is connected to a flash ROM 122. The flash ROM 122 receives its control, address and data signals from the MSIO 120. Preferably, the flash ROM 122 contains the BIOS information for the computer system S and can be reprogrammed to allow for revisions of the BIOS. Additionally, the MSIO 120 provides a parallel port 180, a serial port, a floppy interface, a keyboard interface and a mouse interface, among others, for the computer system S.

A plurality of Quick Connect switches 109 are also connected to the PCI bus 106. Upon detecting a docking sequence between the portable computer 80 and the base unit 90, the Quick Connect switches 109 couple the PCI bus 106 and the IRQSER bus 144 to an expansion PCI bus 107 and an expansion IRQSER bus 145 on the base unit 90. The Quick Connect switches 109 are series in-line FET transistors having low $r_{ds}$, or turn-on resistance, values to minimize the loading on the PCI buses 106 and 107 and the IRQSER buses 144 and 145.

Turning now to the expansion base unit 90, one or more PCI masters 132 are connected on the expansion PCI bus 107, which is adapted to be connected to the PCI bus 106 over the Quick Switches 109 when the portable computer 80 is docked to the expansion base unit 90. The PCI bus 107 is also connected to PCI slots 142 and 144 and also to a card-bus interface 146 for accepting expansion cards. Also connected to the expansion PCI bus 107 is a second system controller 130, which is preferably a second integrated circuit of the same type as the system controller 112. The system controller 130 is configured to be the slave upon power up. As a slave, the write posting buffer is not available in the system controller 130. The system controller 130 is connected to the expansion PCI bus 107 and the interrupt serial bus 145. The system controller 130 supports additional drives 137 and 139 through an the IDE interface 134. The system controller 130 also supports an ISA bus 135 which is connected to one or more ISA slots 136–138. The system controller 130 is further connected to a second MSIO device 140, which provides a secondary parallel port, serial port, and floppy interface.

Thus, the system S, upon docking, may have multiple parallel ports, serial ports, keyboards, mice, and disk drives via the system controllers 112 and 130. Additionally, the system S may have a plurality of PCI and ISA type peripherals on their respective buses. The availability of a plurality of slots allows more peripherals to be connected to the system S and contributes to the useability and flexibility of the portable computer 80 when it is docked to the expansion base unit 90.

Figure 2:
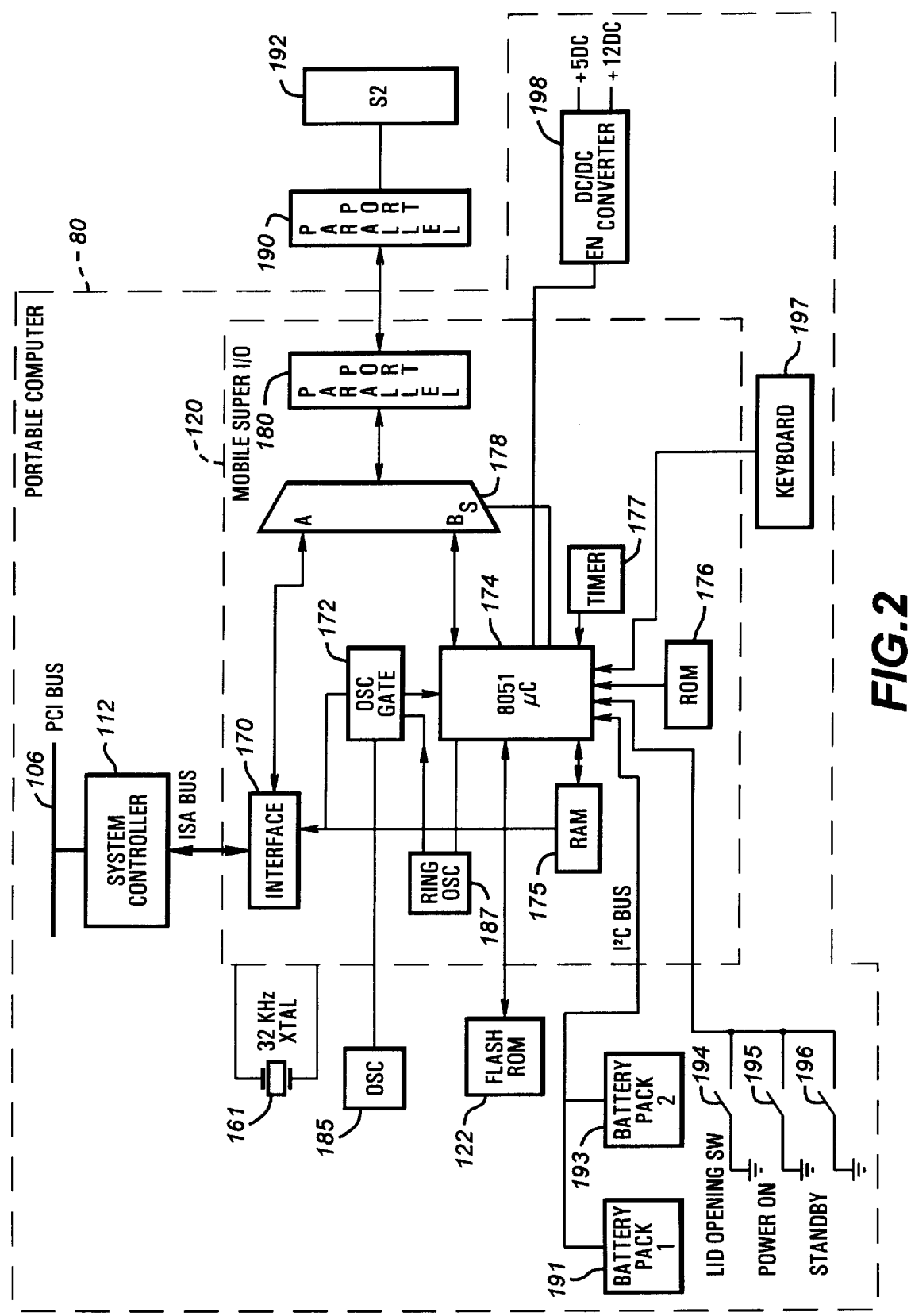
FIG. 2 is a schematic block diagram of the flash ROM updating device of the present invention.

Turning to FIG. 2, the circuitry for sharing the flash ROM 122 between a microcontroller and a microprocessor is disclosed. In FIG. 2, operations directed at the ISA expansion bus are communicated over the PCI bus 106 and directed at the system controller 112. The system controller 112 communicates with the super I/O device 120 over the ISA bus. In the super I/O device 120, an interface unit 170 is connected to the ISA bus for receiving instructions from the CPU 100. The interface 170 provides a number of "mailbox" registers mapped into the I/O memory space to facilitate the interprocessor communication and coordination between the CPU 100 and a microcontroller 174. The interface 170 is connected to the enable input of an oscillator gating circuit 172 to allow the CPU 100 to control the generation of the clock to the microcontroller 174. The oscillator gating circuit, or the variable clock generator, 172 receives a clock signal which is externally generated by an oscillator 185. The oscillator gating circuit or variable clock generator 172 preferably receives a 14 MHz clock signal from the oscillator 185 and generates a programmable clock output that can be selected from 0 MHz, 12 MHz, 14 MHz, or 16 MHz. The oscillator 185 is active when the computer system 80 is in the on state.

Further, a 32 Khz crystal 161 is connected to the MSIO 120 to clock the real time clock (RTC) circuit (not shown), to clock the 8051 microcontroller 174 when it is in a deep sleep mode, and to clock other portions of the MSIO 120. The deep sleep mode is an ultra low power mode where most sections of the microcontroller 174 are shut down to conserve power. This mode is a special mode that is provided as an enhancement to a standard 8051-compatible microcontroller cell. The deep sleep mode is entered when the standard 8051 IDLE instruction is executed with a particular register bit set. In this mode, the microcontroller 174 assumes that it will operate off a ring oscillator 187 and thus arms the ring oscillator 187 such that the ring oscillator 187 will wake up when certain events such as interrupts are presented to the microcontroller 174.

As discussed above, the internal ring oscillator 187 is connected to the oscillator gating circuit 172 to provide clock signals to the microcontroller 174 when the computer system 80 is in the standby mode or when the microcontroller comes out of its deep sleep. The ring oscillator 187 consists essentially of a number of inverters connected together in a looped series arrangement, with a pass transistor connected between the output of one inverter and the input of another inverter such that, upon turning off the pass transistor, the feedback is broken and the oscillation stops. The control gate of the pass transistor is connected to the microcontroller 174 such that the microcontroller 174 can wake up the ring oscillator 187 when certain internal and external events are encountered. The external events that wake up the microcontroller 174 include the actuation of the ring indicator from the modem, the standby button, the hibernation button, PCMCIA card detect, and the PCMCIA ring indicator. The internal events which wake up the microcontroller 174 include events relating to the real time clock alarm, the hibernation time, the keyboard, and the mouse, among others. The ring oscillator is available as a standard ASIC module from SMC Corporation of Hauppauge, N.Y. Finally, the output of the oscillator gating circuit 172 is provided to the clock input of the 8051 compatible microcontroller 174.

Other than the special clock circuits discussed above for the deep sleep feature, the 8051 compatible microcontroller 174 has a random access memory (RAM) 175 and a read only memory (ROM) 176 for storing boot-up instructions. The microcontroller 174 has a built-in timer 177 named Timer_0 which may be used to allow the microcontroller 174 to detect failures when the timer time-outs. The timer 177 is a count-up timer which interrupts at the rollover point. The timer 177's duration and count-up sequencing are controlled by the microcontroller 174. The timer 177 generates an interrupt to the microcontroller 174 upon the completion of its count sequence. The generation of the interrupt to the microcontroller 174 wakes the microcontroller 174 out of its idle mode so that the processing of the routines of the present invention can be performed. The timer 177 is used as a fail-safe mechanism to wake up the microcontroller in the event of power failures and other abnormal operating conditions.

Although a conventional timer can be used, the present invention also contemplates that a watchdog timer can be used in place of the timer 177. In the event that the watchdog timer is used, the software overhead on the microcontroller 174 is reduced, as the watchdog timer will reset the microcontroller 174 in event of an abnormal program execution. If the watchdog timer is not periodically reset by the microcontroller 174, the counter in the watchdog timer overflows, causing the microcontroller 174 to be reset. The watchdog timer thus restarts the microcontroller 174 in abnormal situations, providing for recovery from a hardware or software error.

The microcontroller 174 is also connected to the select input of a two-to-one multiplexer 178. The B input of the multiplexor 178 is connected the input/output lines of the microcontroller 174. The A input of the multiplexor 178 is connected to the interface 170 for transferring data from the parallel port directly to the processor 100 via the system controller 112. The microcontroller 174 has an output connected to the select input S of the multiplexor 178 to control the routing of data from the parallel port 180 to either the interface 170 or the microcontroller 174. The output of the multiplexor 178 is connected to the parallel port 180. The interface 170 and the microcontroller core 174 are connected to the flash ROM 122. Finally, the parallel port 180 communicates with a parallel port 190 (FIG. 2) which is driven by a second computer system 192. The second computer system 192 contains uncorrupted data such as a new valid BIOS to be loaded to the flash ROM 122.

Additionally, the microcontroller 174 of FIG. 2 receives battery statistics from one or more battery packs 191 and 193, which are connected in parallel to provide portable power V to the portable computer 80. Further, the battery packs 191 and 193 communicate over an inter-integrated circuit ($I^2C$) bus, a simple bi-directional two wire bus for efficiently controlling multiple integrated chips. Details of the $I^2C$ bus can be found in the "The $I^2C$-Bus and How to Use It (Including Specification)," published by Phillips Semiconductors, January 1992. Briefly, the $I^2C$ bus consists of two lines: a serial clock (SCL) and a serial data line (SDA). Each of these lines is bidirectional. The SCL line provides the clock signal for data transfers which occur over the $I^2C$ bus. Logic levels for this signal are referenced to VBATT−, which is common to all installed battery packs B. The SDA line is the data line for data transfers which occur over the I2C bus. Again, logic levels for this signal are referenced to VBATT−. As illustrated by a second installed battery pack 193, the battery microcontroller of any additional battery pack is also coupled to the MSIO 120 via the $I^2C$ bus. Low value series resistors (not shown) are typically provided at each device connection for protection against high-voltage spikes.

Each device connected to the $I^2C$ bus is recognized by a unique address—whether it is the MSIO 120 or the battery microcontroller of any installed battery packs 191 and 193. Both the MSIO 120 and battery microcontroller incorporate an on-chip interface which allows them to communicate directly with each other via the $I^2C$ bus. Using the $I^2C$ bus in cooperation with the master battery signal MSTR_BAT reduces the number of interface signals necessary for efficient battery management. Co-pending U.S. patent application No. 08/573,296, entitled "BATTERY PACK WAKEUP" and filed on Dec. 15, 1995, illustrates various aspects of nickel-based and lithium ion battery packs and communications over a serial bus. This application is hereby incorporated by reference.

Further, the microcontroller 174 also receives inputs from a plurality of switches, including a computer lid opening switch 194, a power on switch 195, and a standby switch 196. The lid opening switch 194 senses when the lid of the computer system 80 is opened, indicating that the user is about to activate the computer system 80. The power on switch 195 allows the user to turn on the portable computer 80, while the standby switch 196 allows the user to put the portable computer system 80 to an idle mode or a sleep mode to conserve power. Preferably, the actuation of the switches 194, 195 and 196 generates an interrupt to the microcontroller 174 and causes the microcontroller 174 to exit its deep sleep mode, if the microcontroller 174 is in such a mode, and further causes the microcontroller 174 to branch to an appropriate interrupt handler to respond to the actuation of the switches or the insertion/removal of the battery packs 191 and 193.

Finally, the microcontroller 174 is connected to a keyboard 197 for receiving data entries from the user. The microcontroller 174 is further connected to a DC/DC converter 198 which provides regulated +5 VDC and +12 VDC to the VCC2 plane to power the portable computer 80. The DC/DC converter receives a DC voltage supplied by an AC/DC converter (not shown) which is connected to the AC power at a docking station (not shown). When the portable computer unit 80 is docked with its docking station, it communicates with peripheral devices, receives DC currents for charging batteries plugged into the portable computer 80 and for operating the portable computer unit 80. The DC/DC converter 198 has an enable input driven by the microcontroller 174 such that the microcontroller 174 can turn on or off the DC/DC converter 198.

Figure 3:
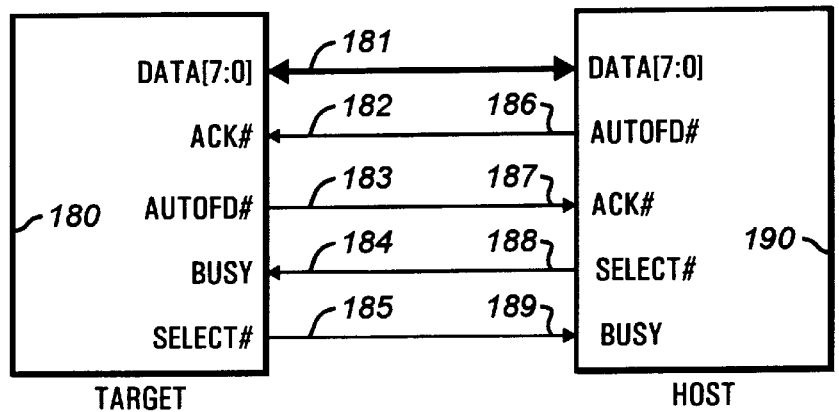
FIG. 3 is a schematic diagram of the connections between the parallel port of FIG. 1 and a parallel port of a second computer supplying new data to be programmed into the flash ROM of FIG. 2.

Turning to FIG. 3, the connection between the parallel ports 180 and 190 is disclosed in more detail. Data is transferred between the parallel ports 180 and 190 using a bidirectional, 8-bit protocol. In general, when referring to signals in this description, a "#" after a signal mnemonic indicates that it is logically true when a low voltage level is present and angle brackets with included numbers after a signal mnemonic are used to indicate single or multi-bit positions in a wider logical signal such as the data or address fields.

In FIG. 3, the parallel port 180 has a plurality of data lines 181 which are connected to the data lines of the parallel port 190 via a suitable cable (not shown). Further, an acknowledge signal ACK# 187 of the parallel port 180 is connected to an autofeed signal AutoFD# 186 of the parallel port 190. Correspondingly, an AutoFD# signal 183 of the parallel port 180 is connected to the ACK# signal 187 of the parallel port 190. Next, a SELECT# signal 188 of the parallel port 190 is connected to a BUSY signal 184 of the parallel port 180. Correspondingly, a SELECT# signal 185 of the parallel port 180 drives the BUSY signal 189 of the parallel port 190.

The parallel port 190 thus is connected via the cable straight through the parallel port 180 to provide an input/output path out of the MSIO 120. The busy lines 184 and 189, as well as the select lines 185 and 188 are crossed to provide a hardware handshake for data transmission between the MSIO 120 and the host computer 192 driving the parallel port 190. By having independent control lines for input and output, critical timing issues are avoided. In this context, the computer system 80 never initiates communication with the host computer 192. Rather, the portable computer 80 will only send bytes in response to commands and requests from the host computer 192.

Figure 4A:
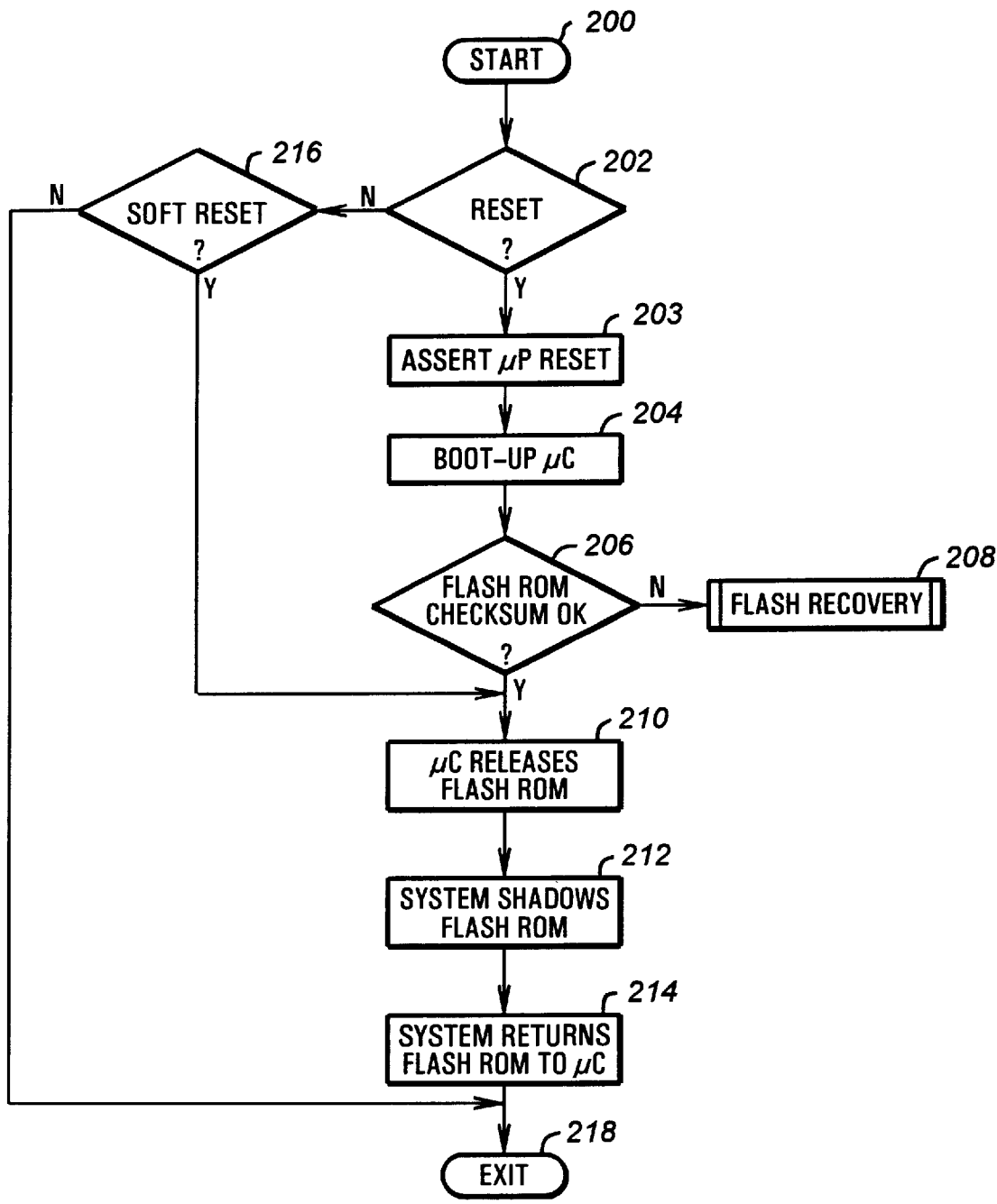
FIG. 4A is a flow chart illustrating the process for booting up the computer system of FIG. 1.

FIG. 4A describes the basic power-up sequence in the computer of FIG. 1 where the microcontroller 174 is booted up before the processor 100 is booted up. In FIG. 4A, the occurrence of a system reset is checked in step 202. If the system reset has not been requested, the microprocessor 100 reset input remains asserted in step 203, but the microcontroller 174 reset input is released so that the microcontroller 174 can execute instructions.

In step 204, the microcontroller 174 boots-up using codes stored in the ROM 176 by executing the instructions starting at address 0000h in its 8051 address space. The microcontroller 174 then initializes the RAM 175 by clearing it.

In step 206, the microcontroller 174 checks the integrity of the flash ROM 122 by performing a checksum computation on the bottom-most 16 KB segment of the flash ROM 122 content. The checksum is preferably determined at step 206 by adding, without carry, the lowest 8,192 16-bit words of the flash ROM 122. While the addition is being performed, the routine also verifies that the 16 KB are not all zero. If the flash ROM 122 segment passes the checksum test, the routine proceeds to step 210. Alternatively, if the flash ROM 122 check-sum indicates a failure in step 206, the flash ROM 122 has been corrupted and needs to be reprogrammed in step 208. The apparatus and process for performing the flash recovery step 208 are disclosed below.

Alternatively, from step 206, if the flash ROM 122 memory passes the check-sum process, the microcontroller 174 both releases its ownership of the flash ROM 122 in step 210 and deasserts the reset input of the CPU 100 to allow the CPU 100 to boot-up with ownership of the flash ROM 122. When the CPU 100 which is an Intel 80×86 CPU in the preferred embodiment first powers up, the CPU 100 executes the instruction located 16 bytes from the highest memory address. For an 8086–8088 CPU, this address is FFFF0h. For an 80286 CPU, it is 0FFFFF0h, for the 80386, 80486 and Pentium CPUs, it is 0FFFFFFF0h. Typical IBM PC/AT compatible systems have a jump instruction at this address to the beginning of the power-on-self-test (POST) routine of the system ROM BIOS. The POST tests the microprocessor 100, memory 102, and other hardware components for their presence and integrity, and also initializes various interrupt vector table entries with default values pointing to handler routines within the system BIOS. As part of its duties, the POST scans for add-on ROM BIOS modules beginning at every 2 k-byte increment from address C0000h to DFFFFh. At each increment, it checks for a signature of 55h at offset zero, and AAh at offset one to indicate a valid add-on ROM BIOS module. The byte at offset two then contains the length of the BIOS module, as measured in 512 byte blocks, and offset three begins the executable code for the module. The POST executes a "far call" instruction to the offset three byte to permit the module to perform its own initialization. The module executes a "far return" instruction to return to the POST. The portion of the POST which checks for ROM BIOS modules is known as BIOS sizing.

Next, in step 212, the CPU 100 performs a shadow operation to enhance the access speed to the routines stored in the BIOS. Shadowing is performed by copying the contents of selected portions of the flash ROM 122 memory to DRAM 102 at appropriate memory address locations.

The portion of the DRAM main memory which receives such portion of the BIOS is sometimes referred to as "shadowed RAM." More specifically, in the standard system architecture, the logical main memory address space is divided into a low memory range (0h–9FFFFh), a reserved memory range (A0000h–FFFFFh) and an extended memory range (100000h–FFFFFFh). In a typical system, the system ROM BIOS is located logically at addresses F0000h–FFFFh, and is located physically on the I/O bus. Addresses C0000h–EFFFFh contain ROM BIOS portions of the specific add-on cards and are located physically on their respective cards on the I/O bus. Further, addresses A0000h–BFFFFh contain the video buffer, located physically on a video controller on the I/O bus. Duplicate memory space is typically provided in the dynamic RAM on local bus for addresses C0000h–FFFFFh, and a user of the system can select during a setup procedure which portions of the ROM BIOS are to be shadowed by being copied into the duplicate DRAM space during boot up. The address of the shadow RAM area is then mapped onto the address of the flash ROM 122 address space by the memory controller 101. Once shadowed, accesses to BIOS routines are accelerated because the RAM access time is much faster than the ROM access times. Subsequent accesses to "shadowed" portions of the BIOS are to the dynamic RAM copy, which is typically much faster than accesses to the ROM copy.

In step 214, the CPU 100 returns ownership of the flash ROM 122 back to the microcontroller 174. This is achieved by restarting the microcontroller clock by enabling the oscillator 172 via an appropriate register write. Once the clock signal is restarted, the CPU 100 writes to a mailbox register to generate an interrupt to the microcontroller 174 to wake it up from its IDLE mode. The details of the arbitration scheme in sharing the resource, or flash ROM 122, is disclosed in more detail in co-pending patent application entitled "FLASH ROM SHARING" previously incorporated by reference. Alternatively, from step 202, if reset has not been asserted but a soft reset has been requested by the CPU 100, the routine of FIG. 3 jumps to step 210 to cause the microcontroller 174 to bypass the system reset. Next, the routine exits in step 218.

Figure 4B:
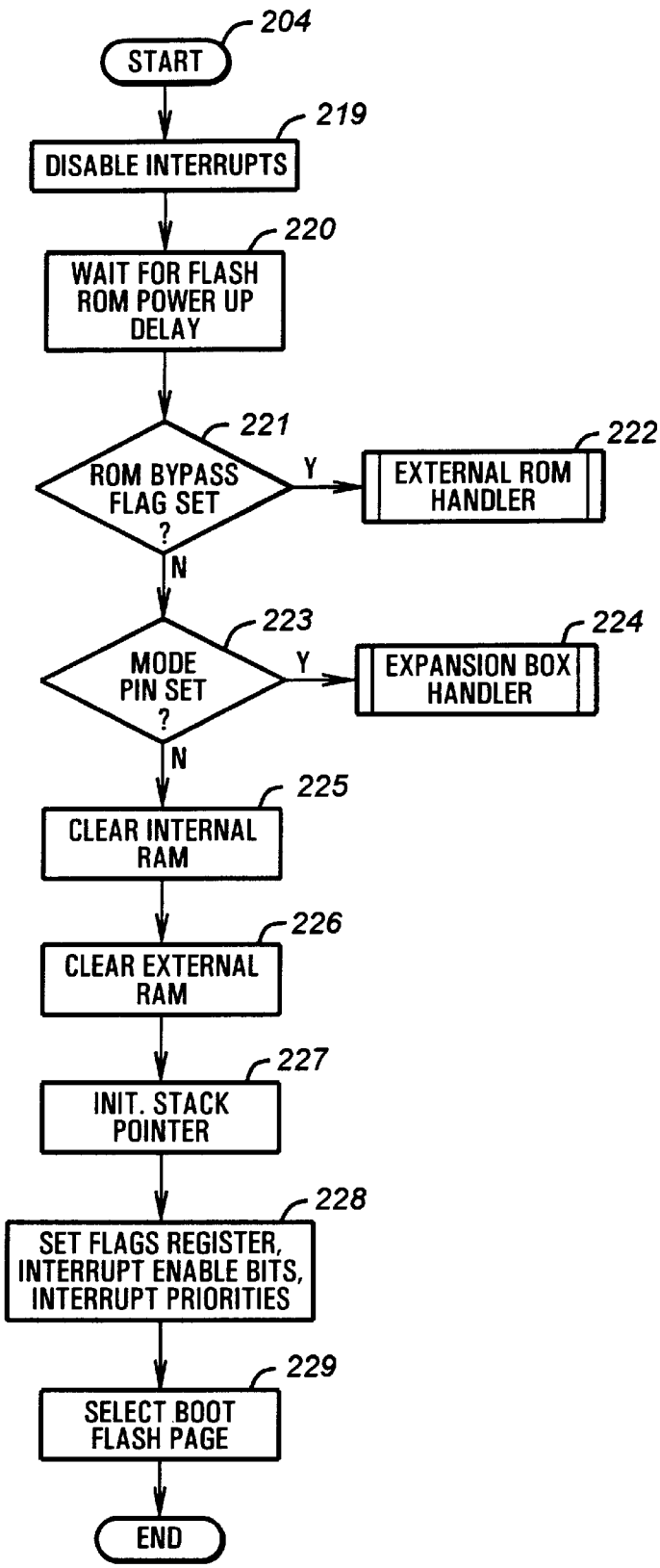
FIG. 4B is a flow chart illustrating the process of booting up the microcontroller of FIG. 4A.

Turning now to FIG. 4B, the process for booting up the microcontroller 174 (step 204 of FIG. 4A) is shown in more detail. From step 204, the microcontroller 174 disables its interrupts in step 219. Next, the microcontroller 174 waits a predetermined period for the flash ROM 122 to power up properly in step 220. Once the flash ROM 122 has properly powered up, the routine next checks to see if the ROM bypass flag has been set in step 221. If the ROM bypass flag has been set, the routine jumps to an external ROM handling routine in step 222.

Alternatively, if the ROM bypass flag has not been set in step 221, the routine next checks to see if the mode pin has been set in step 223. If the mode pin has been set, indicating that the parallel port is in the expansion base unit 90 rather than in the portable computer 80, the routine jumps to the expansion box handler in step 224. Alternatively, if the microcontroller 174 is operating in the portable computer 80, the microcontroller 174 next clears its internal RAM in step 225. From step 225, the routine clears the external RAM in step 226 and initializes the stack pointer in step 227. Further, the microcontroller 174 appropriately sets flag registers, interrupt enable bits, interrupt priorities in step 228. The routine then selects the highest 32 KB flash ROM page in step 229 which stores the BIOS content before exiting the routing of FIG. 4B. The selection of the 32 KB flash ROM page enables the BIOS in the CPU 100 to access the flash ROM 122 during the boot-up of the computer system S.

Figure 5:
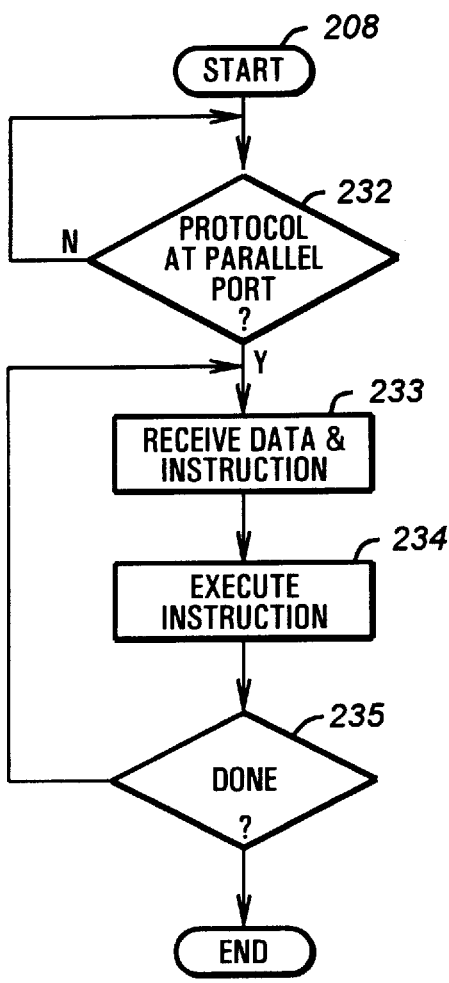
FIG. 5 is a flow chart illustrating the process of flash recovery of FIG. 4A.

Turning to FIG. 5, the routine for the microcontroller 174 to receive and parse commands and data necessary to update the flash ROM 122 is disclosed. From the start step 208, the routine checks for the appearance of a flash programming protocol sequence at the parallel port 180 in step 232. The flash programming protocol sequence will be provided by the second computer system 192 which contains valid BIOS code to be transferred to the flash ROM 122. If not, the routine remains in step 232 until the flash programming protocol sequence has appeared at the parallel port 180. From step 232, the routine receives instructions and data from the second computer 192, which stores the known good copy of the BIOS, in step 233. In step 234, the routine parses the commands and data from the second computer 192.

The routines and timing diagrams associated with the protocol detection process are illustrated in FIGS. 6–11, while the routines to parse commands and program the flash ROM 122 with new data are shown in FIGS. 12A, 12B and 13.

Figure 6:
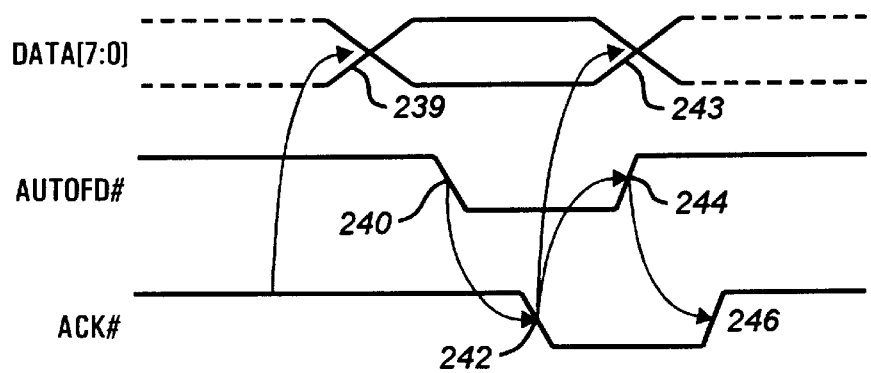
FIG. 6 is a timing chart illustrating the host sending to target sequence in the protocol detection step of FIG. 5.

Turning to FIG. 6, a timing chart illustrating the host sending to target protocol is disclosed. In FIG. 6, the host computer 192 ensures that ACK# is deasserted, or at a logic high state. Next, the host computer 192 places data on the bus in period 239 and further drives AutoFD# true, or logic low, in step 240. When the AutoFD# signal becomes a logic low in period 240, the target, which in this case is the portable computer 80, responds, latching the data and driving ACK# low at time 242. After the target 80 has driven ACK# low, the host computer 192 releases the data lines in period 243 and releases AutoFD#, allowing it to be pulled up to a high logic level in period 244. The target 80 then responds by releasing ACK# allowing it to be pulled to a high logic level in period 246. This completes the host sending to target sequence protocol, with ACK# again being high for the next transmission from the host.

Figure 7:
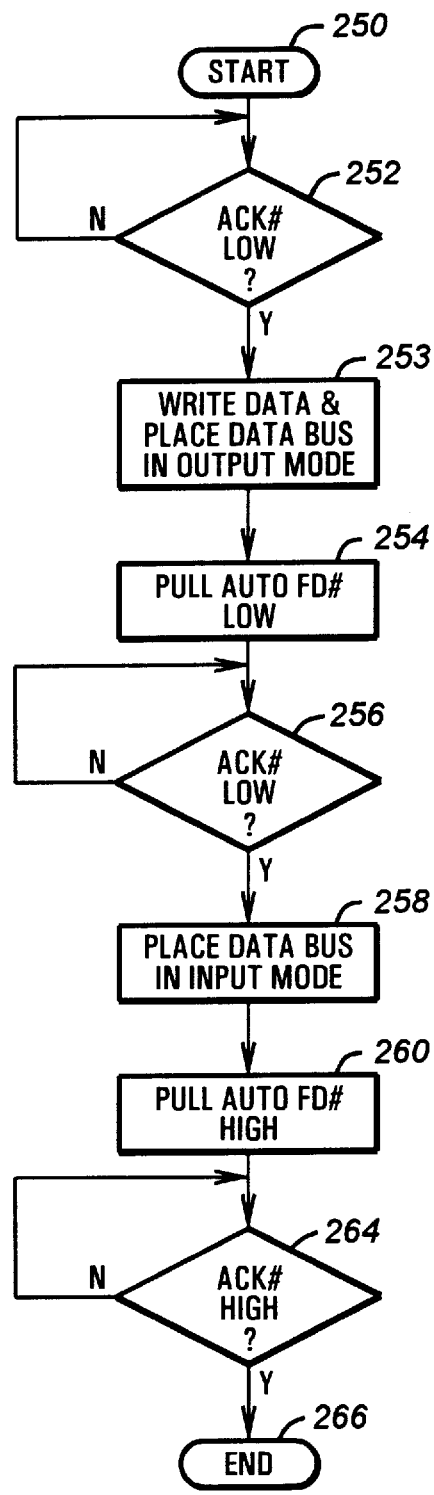
FIG. 7 is a flow chart illustrating the host sending to target sequence of FIG. 6.

The generation of the host sending to target protocol between the microcontroller 174 of the target 80 and the second computer system 192 is further illustrated in the flowchart of FIG. 7. From the start step 250, ACK# is checked to see if it has been placed in a logic low in step 252 (see timing diagram of FIG. 6). If not, the host computer 192 waits until ACK# has been placed in a logic low in step 252. From step 252, the host computer 192 puts the data bus into the output mode and places data on the bus in step 253. Next, the host computer 192 pulls AutoFD# low in step 254. In step 256, ACK# is checked to see if it has been driven low by the target 80. If not, the host computer 192 waits for ACK# to be driven low by the target 80. Once ACK# is low in step 256, the host computer 192 pulls AutoFD# high in step 260. Next, the host computer 192 checks for ACK# being driven high by the target 80 before the host computer 192 completes the process of FIG. 7 in step 266.

Figure 8:
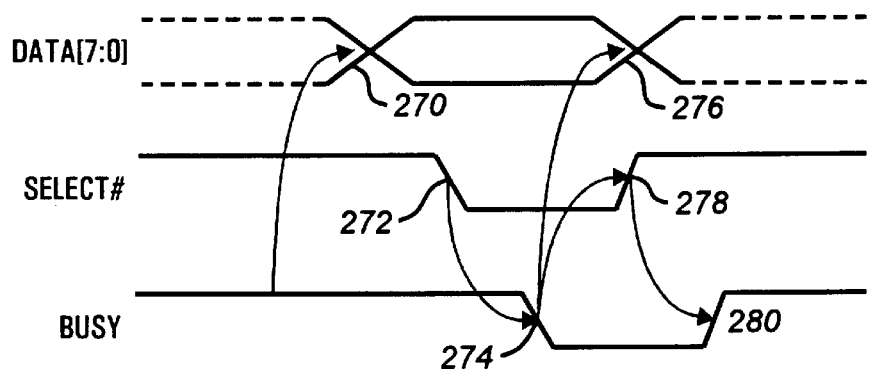
FIG. 8 is a timing chart illustrating the target response sequence in FIG. 5.

Turning to FIG. 8, the timing chart illustrating the target response protocol is disclosed. The target response protocol is observed at the target side of FIG. 3, which represents signals at the parallel port 180. The port 180, when operating in accordance with the present invention, does not follow the standard parallel printer port protocol in that the signals SELECT# and BUSY do not conform to the conventional parallel port logic/voltage convention. In FIG. 8, the target 80 waits for the BUSY of the host computer 192 to be at a high level, whereupon the target places valid data on the data bus in time period 270. In time period 272, SELECT# is asserted by the target 80, causing the host computer 192 to latch the data and pull BUSY low in time 274. After data has been sent in step 276, the target 80 pulls SELECT# high in step 278. The placement of SELECT# at a high level in step 278 causes the host computer 192 to respond by placing BUSY at a high level in time period 280, thus completing the target response sequence.

Figure 9:
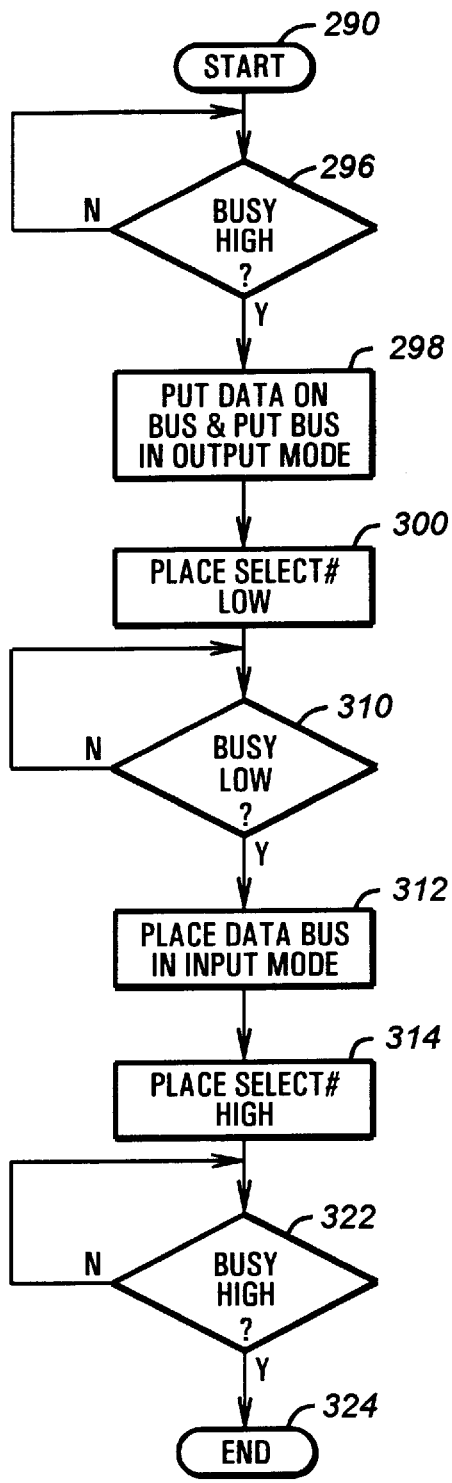
FIG. 9 is a flow chart illustrating the steps by the target in generating the sequence of FIG. 8.

Turning to FIG. 9, the flowchart disclosing the steps taken by the target in responding to the host send sequence in accordance with the protocol of FIG. 8 is disclosed. From step 290, the target 80 checks to see if BUSY signal is at a high state in step 296. If not, the routine waits until BUSY becomes high, indicating that the parallel port is available for data transmission. From step 296, once BUSY is at a high state, the target 80 puts the data on the parallel port data bus and puts the data bus in the output mode in step 298. It then pulls SELECT# low in step 300. Next, BUSY is checked in step 310 to see if it is low. If BUSY is low in step 310, the data bus is returned to the input mode in step 312. Next, the target 80 places SELECT# in the high state in step 314. Next, in step 322, the target 80 waits until busy is driven high by the host computer 192 before the target 80 completes the target response process in step 324.

Figure 10A:
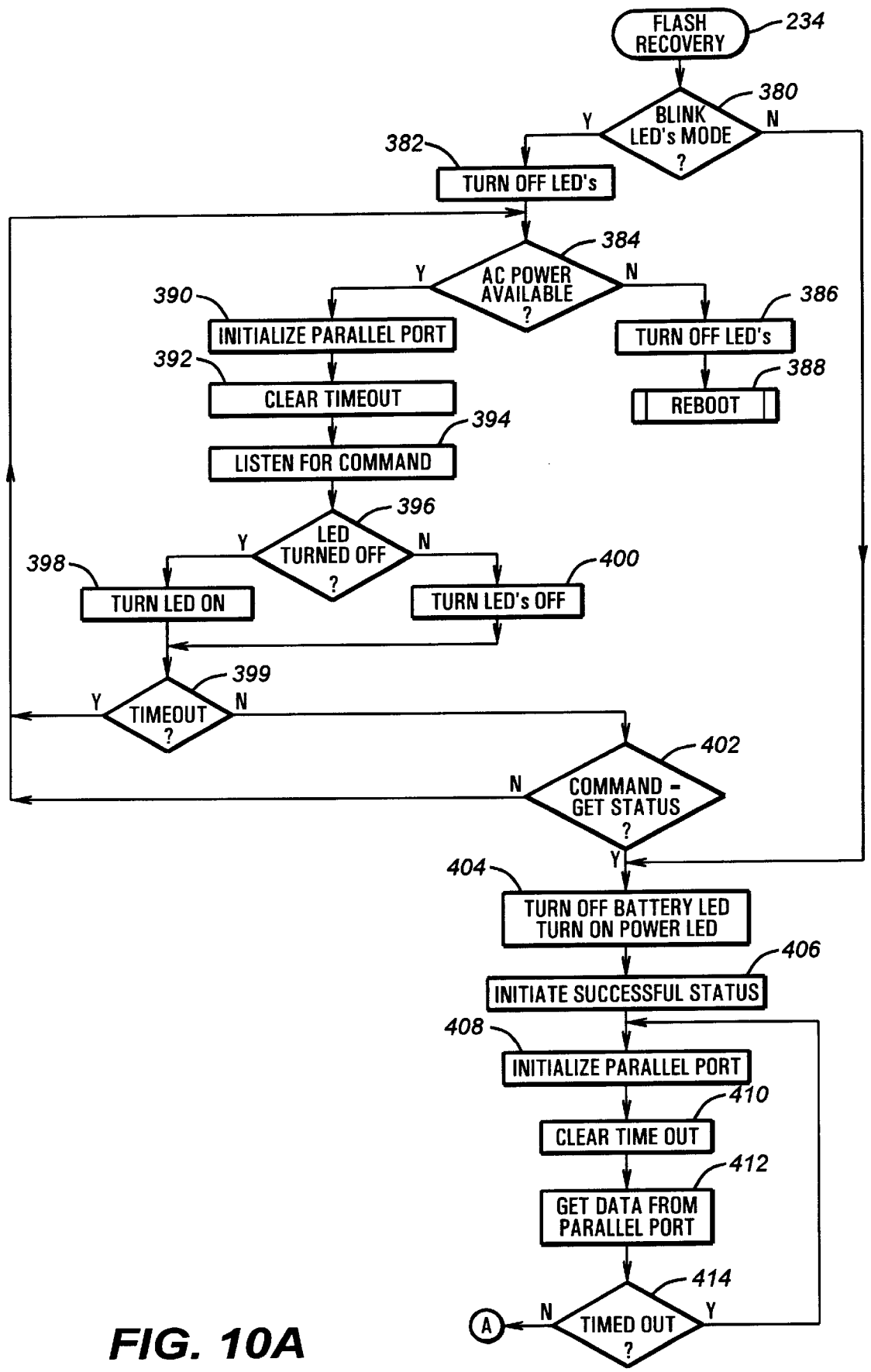
FIGS. 10A and 10B are flow charts illustrating the steps in parsing and executing the commands transmitted from the data port in FIG. 5.
Figure 10B:
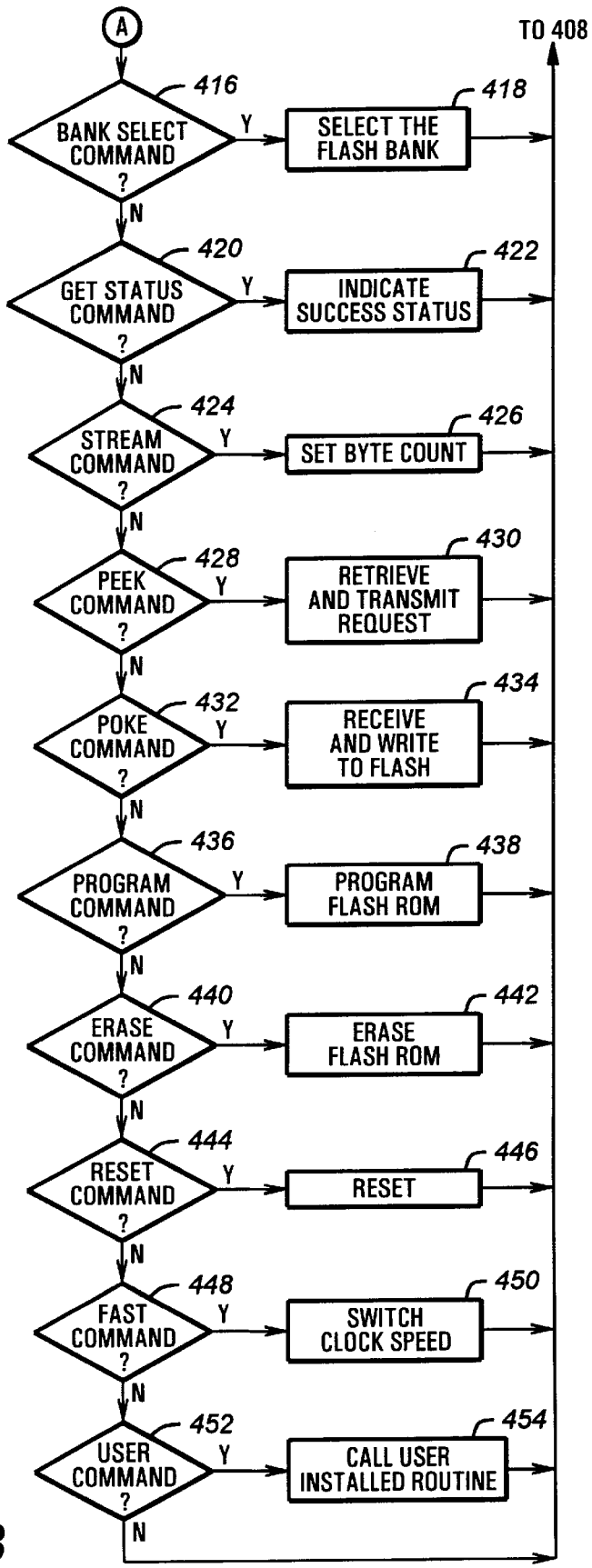

Turning now to FIGS. 10A and 10B, the routine in the microcontroller 174 to parse commands transmitted over the parallel port and to execute the commands is shown. In FIG. 10A, the routine is entered via the flash recovery step 234. After step 234, the routine checks to see if the computer system is in an optional mode where the Light Emitting Diodes (LEDs) on the keyboard are blinked in step 380. If so, the routine turns off the LEDs in step 382. Next, the routine checks to see if power is available in step 384. If the Alternating Current (AC) power is not available, the routine turns off the LEDs in step 386 and forces a reboot of the microcontroller 174 in step 388. The reboot is accomplished by jumping to location 0000h.

From step 384, if AC power is available, the routine initializes the parallel port in step 390. Next, the routine clears the time-out register in step 392. From step 392, the routine listens for a command from the parallel port 180 in step 394. If the routine does not receive a command within ¼ of a second, the routine times-out and continues to step 396 where the routine checks if the LEDs have been turned off in step 396. If not, the routine turns the LEDs off in step 400. Alternatively, if the LEDs have been turned off in step 396, the routine turns the LEDs on in step 398. Thus, the effect of steps 396–400 is to cause the LEDs to blink.

From step 398 or step 400, the routine checks for a timeout in step 399 before it examines the command transmitted on the parallel port 180. If a timeout occurred in step 399 or if the command is not a GETSTATUS command in step 402, the routine simply loops back to step 384 until there is no timeout and the command is the GETSTATUS command.

From step 402, once the command is the GETSTATUS command, the routine is permitted to continue with the data upload or download process. Thus, in step 404, the routine turns off the battery LED and turns on the power LED to indicate that it has successfully navigated through the protocol negotiation. It also sets the status flag to indicate success in step 406.

Next, from step 406 or from step 380, the routine initializes the parallel port 190 in step 408. The time-out register is also cleared in step 410. Finally, data is retrieved from the parallel port 190 in step 412. In the event that data transmission has timed out in step 414, the routine loops back to step 408 to restart the data receiving process. Alternatively, in the event that data has been successfully retrieved from the parallel port 190, the routine jumps to step 416 to parse and execute the received command from the second computer system 192, as shown in more detail in FIG. 10B.

Turning now to FIG. 10B, the process for parsing the commands and for executing the requested command is shown. In FIG. 10B, from step 414 of FIG. 10A, the routine determines if the command is a BANKSELECT command in step 416. If so, the routine selects a flash bank, or a 32 KB segment of flash memory, as requested in step 418.

If the command is not the BANKSELECT command in step 416, the routine determines if the command is a get status command (GETSTATUS) in step 420. If so, the routine indicates its success status in step 422. Alternatively, from step 420, if the command is not a GETSTATUS command, the routine next determines if the command is a STREAM command which provides for a burst transfer of a predetermined block of data in step 424. If so, the routine accepts and sets the byte count parameters in step 426.

From step 424, if the command is not a STREAM command, the routine checks to see if the command is a PEEK command which allows the second computer 192 to examine a particular memory location in step 428. If so, the microcontroller 174 retrieves the requested byte and writes the byte back in reply to the PEEK command in step 430.

Alternatively, from step 428, if the command is not a PEEK command, the routine determines if the command is a POKE command which allows the second computer 192 to write to a particular memory location in step 432. If so, the routine receives the byte and writes the appropriate byte to the flash ROM 122 in step 434.

Alternatively, from step 432, if the command was not a POKE command, the routine next determines if the command is a PROGRAM command which updates the flash ROM 122 in step 436. If so, the routine programs the flash ROM 122 in step 438, as shown below in FIG. 13.

Alternatively, from step 436, if the command is not a PROGRAM command, the routine then determines if the command is an ERASE command in step 440. If so, the routine erases the flash ROM block in step 442. From step 440, if the command is not an ERASE command, the routine checks to see if the command is a RESET command in step 444. If so, the routine resets the computer system in step 446 by asserting the reset input of the CPU 100 and by jumping to address 0h of the microcontroller 174.

From step 444, if the command is not a RESET command, the routine determines if the command is a FAST command in step 448. If so, the routine switches the clock speed in step 450 to account for higher speed flash ROMs. Finally, from step 448, if the command is not the FAST command, the routine determines if the command is a user defined command in step 452. If so, the routine calls a user-install routine in step 454. From step 452, if the command is not recognized, the routine loops back to step 408 to continue processing of the commands. In this manner, each command is processed one at a time, in accordance with the protocol of the present invention.

Figure 11:
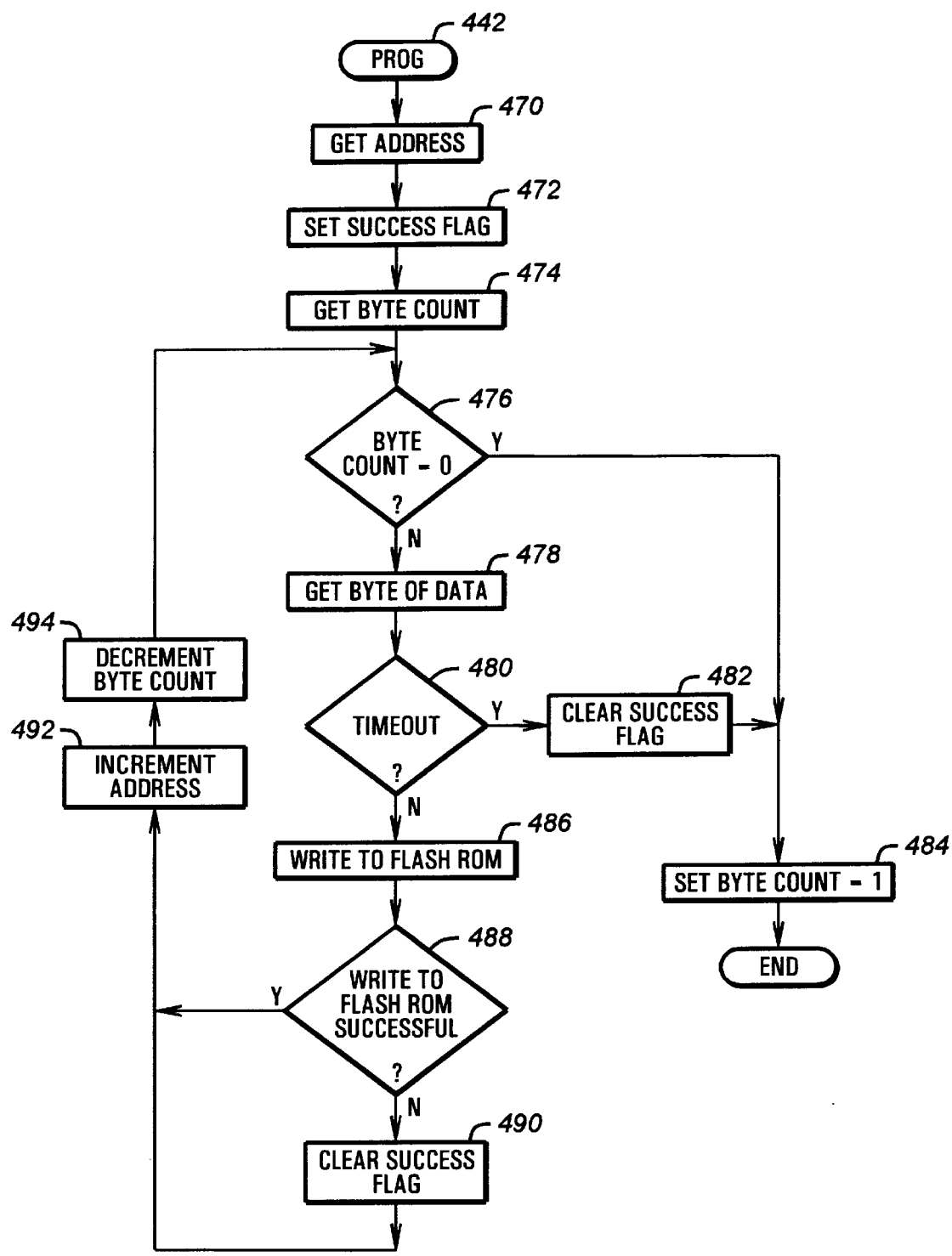
FIG. 11 is a flow chart illustrating the steps in updating the contents of the flash ROM of FIG. 1 in accordance with the present invention.

Turning now to FIG. 11, the routine to program the flash ROM 122 is shown. From the programming step 442, the routine of FIG. 11 retrieves the programming address in step 470. Next, the SUCCESS flag is set in step 472. In step 474, the routine retrieves the count of the bytes to be written to the flash ROM 122.

Next, in step 476, the routine determines if the bank count is equal to zero. If not, the routine retrieves the data over the parallel port 180 in step 478. The routine then determines if the data transfer has timed out or not in step 480. If not, the routine has successfully retrieved the data. This data is written to the flash ROM 122 in step 486. As is known in the art, the flash ROM 122 is programmed by selectively applying a voltage to one or more programming pins of the flash ROM 122, followed by appropriate data and a write instruction to the flash ROM 122.

Next, the routine checks in step 488 to determine if the write to the flash ROM 122 has been successful or not. If not, the routine clears the SUCCESS flag in step 490. From step 490 or from step 488, the routine increments the address in step 492. Next, the routine decrements the byte count in step 494 before looping to step 476 to program the next byte of the flash ROM 122.

From step 476, if the byte count equals zero, the routine has completed the programming of the flash ROM 122. It proceeds to step 484 where the byte count is set to 1 before it exits. Further, from step 480, if the data transmission has timed out, the SUCCESS flag is cleared in step 482 before the routine sets a byte count in step 484 and ultimately exits.

Thus, the computer system of the present invention allows the flash ROM content to be updated in accordance with a flash programming protocol appearing at the parallel port of the computer system. In the present invention, after the microcontroller boots up, the microcontroller checks the flash ROM contents by performing a check-sum of the flash ROM contents. If the checksum of the flash ROM contents matches an expected value, the microcontroller releases ownership of the flash ROM to the computer system so that the computer system boots-up as normal. At this stage, if the user wishes to update the flash ROM, the user can instruct the computer system to listen for a flash programming protocol and to store the incoming data to the flash ROM.

Alternatively, if the microcontroller determines that the flash ROM has become corrupted, the microcontroller accesses a parallel port and looks for a flash programming protocol. If the protocol is present at the parallel port, the microcontroller receives the data from the parallel port and programs the flash ROM accordingly. Thus, the flash ROM can be updated to a known valid state, even if the computer system is not able to boot up due to, among other things, the corruption of the flash ROM.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:

a processor;

a system memory coupled to said processor;

an expansion bus coupled to said processor;

a disk drive coupled to said processor for storing data and providing data, said disk drive coupled to said expansion bus;

a data port coupled to said expansion bus;

a reprogrammable memory coupled to said expansion bus, said reprogrammable memory storing a boot code for execution by said processor upon power up of the computer system;

a microcontroller coupled to said expansion bus, to said reprogrammable memory, and to said data port, said microcontroller initially having access to said reprogrammable memory, said microcontroller selectively communicating with a host computer over said data port; and an integrity checker to check the integrity of said boot code in said reprogrammable memory and to indicate whether the integrity of said boot code has been compromised, wherein if the integrity of said boot code has been compromised upon power up, said microcontroller receives data from said data port and stores said data in said reprogrammable memory as said boot code.

2. The computer system of claim 1, wherein said data being transmitted over said data port is a software update.

3. The computer system of claim 1, wherein said reprogrammable memory is a flash read-only-memory (ROM).

4. The computer system of claim 1, wherein said reprogrammable memory is a non-volatile random-access-memory (NV-RAM).

5. The computer system of claim 1, wherein said reprogrammable memory stores a primary boot code for execution by said processor upon power up of the computer system.

6. The computer system of claim 5, wherein said reprogrammable memory stores a second boot code for execution by said microcontroller upon power up of the computer system.

7. The computer system of claim 5, further comprising an arbitrator coupled to said processor for relinquishing said reprogrammable memory to said processor for executing said primary boot code during the power up of the computer system.

8. The computer system of claim 5, wherein said system memory has a shadow region and wherein said processor copies said primary boot code in said shadow region if said integrity checker indicates that said boot code is valid.

9. The computer system of claim 8, wherein said processor returns control of said reprogrammable memory to said microcontroller after said primary boot code has been shadowed.

10. The computer system of claim 1, wherein said microcontroller further comprises a command parser coupled to said data port.

11. The computer system of claim 10, wherein said command parser executes a command selected from a group consisting of:

memory bank select command;

a status inquiry command;

a block transfer command;

a peek command;

a poke command;

a program memory command;

an erase memory command;

a reset command;

a speed change command; and a user programmable command.

12. The computer system of claim 1, further comprising a code update system having a memory for storing updated data and a second data port, said code update system transmitting updated data from said second data port to said data port.

13. The computer system of claim 1, wherein said data port is a parallel port.

14. The computer system of claim 1, wherein said microcontroller further comprises a flash programming protocol detector coupled to said data port.

15. The computer system of claim 14, wherein said flash programming protocol detector detects a host sending to target sequence and a target response sequence.

16. The computer system of claim 15, wherein said data port has a busy signal and a select signal, and wherein said target response sequence is performed using the busy and select signals.

17. The computer system of claim 15, wherein said data port has an autofeed signal and an acknowledge signal, and wherein said host sending to target sequence is performed using the autofeed and acknowledge signals.

18. The computer system of claim 1, wherein said integrity checker comprises a checksum generator running on said microcontroller.

19. The computer system of claim 18, wherein said integrity checker operates on an 8051-compatible microcontroller.

20. The computer system of claim 1, wherein said microcontroller is an 8051 compatible microcontroller.

21. A method for updating a boot code of a computer system, said computer system having a processor coupled to a system memory and an expansion bus; the processor booting the computer system using a boot code, said expansion bus coupled to a data port; a reprogrammable memory having the boot code; and a microcontroller which initially has access to said reprogrammable memory after power up; said microcontroller selectively communicating with a host computer and receiving data over said data port, said method comprising the steps of:

initially accessing the reprogrammable memory with the microcontroller after power-up;

checking the integrity of said boot code in said reprogrammable memory before the processor boots the system; and if the integrity of said boot code has been compromised, performing the steps of:

receiving data from said data port; and storing said data in said reprogrammable memory as said boot code; and booting the computer system using said processor after said checking step and said if step.

22. The method of claim 21, wherein said data receiving step further comprises the step of waiting for a programming protocol to appear at said data port before said data receiving step.

23. The method of claim 22, further comprising the step of decoding commands from said programming protocol.

24. The method of claim 23, wherein said command decoding step further comprises the step of identifying a command selected from a group consisting of:

a memory bank select command;

a status inquiry command;

a block transfer command;

a peek command;

a poke command;

a program memory command;

an erase memory command;

a reset command;

a speed change command; and a user programmable command.

25. The method of claim 21, wherein said storing step further comprises the step of programming said reprogrammable memory.

26. The method of claim 25, wherein said programming step further comprises the step of bulk erasing said reprogrammable memory before writing the new data to said reprogrammable memory.

27. The method of claim 21, further comprising the step of allowing said processor access to said reprogrammable memory after said storing step.

28. The method of claim 27, wherein said allowing step further comprises the step of shadowing said data from said reprogrammable memory into said system memory.

29. The method of claim 28, further comprising the step of returning control of said reprogrammable memory to said microcontroller.

30. The method of claim 28, further comprising the step of transmitting code update from a second system over a second data port to said data port.

31. The method of claim 30, wherein said transmitting step transmits boot code update to said reprogrammable memory.

32. An apparatus for updating codes for execution by a processor, said processor coupled to an expansion bus, said apparatus comprising:

a reprogrammable memory coupled to said expansion bus, said reprogrammable memory storing a boot code for execution by the processor upon power up of the processor;

a data port coupled to said expansion bus;

a microcontroller coupled to said expansion bus, to said reprogrammable memory, and to said data port, said microcontroller initially having access to said reprogrammable memory, said microcontroller selectively communicating with a host computer over said data port; and an integrity checker to check the integrity of said boot code in said reprogrammable memory and to indicate whether the integrity of said boot code has been compromised, wherein if the integrity of said boot code has been compromised upon power up, said microcontroller receives data from said data port and stores said data in said reprogrammable memory as said boot code.

33. The apparatus of claim 32, wherein said data being transmitted over said data port is a software update.

34. The apparatus of claim 32, wherein said reprogrammable memory is a flash read-only-memory (ROM).

35. The apparatus of claim 32, wherein said reprogrammable memory is a non-volatile random-access-memory (NV-RAM).

36. The apparatus of claim 32, wherein said reprogrammable memory stores a primary boot code for execution by said processor upon power up of the computer system.

37. The apparatus of claim 36, wherein said reprogrammable memory stores a second boot code for execution by said microcontroller upon power up of the computer system.

38. The apparatus of claim 36, further comprising an arbitrator coupled to said processor for relinquishing said reprogrammable memory to said processor for executing said primary boot code during the power up of the computer system.

* * * * *